(12) United States Patent
Quindt et al.

(10) Patent No.: US 7,434,866 B2
(45) Date of Patent: Oct. 14, 2008

(54) LATCH ASSEMBLY FOR A CONVERTIBLE TOP

(75) Inventors: Reinhard W. Quindt, Novi, MI (US); William T. White, Howell, MI (US)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 11/532,923

(22) Filed: Sep. 19, 2006

(65) Prior Publication Data

US 2008/0067833 A1    Mar. 20, 2008

(51) Int. Cl.
*B60J 7/185* (2006.01)

(52) U.S. Cl. ............. 296/121; 296/120.1; 292/DIG. 5

(58) Field of Classification Search ............ 296/107.01, 296/107.16, 107.17, 108, 120.1, 121, 122; 292/171, 144, 175, 150, DIG. 5, 141, 145
See application file for complete search history.

(56) References Cited

U.S. PATENT DOCUMENTS

| | | | | |
|---|---|---|---|---|
| 2,201,330 | A | * | 5/1940 | Wernig et al. ............... 292/48 |
| 2,831,718 | A | * | 4/1958 | Hallek et al. ............... 292/48 |
| 5,785,375 | A | | 7/1998 | Alexander et al. |
| 5,979,970 | A | | 11/1999 | Rothe et al. |
| 6,053,560 | A | | 4/2000 | Rothe |
| 6,217,104 | B1 | | 4/2001 | Neubrand |
| 6,318,793 | B1 | | 11/2001 | Rapin et al. |
| 6,336,673 | B1 | | 1/2002 | Rothe et al. |
| 6,964,340 | B2 | | 11/2005 | Neubrand |
| 7,066,523 | B2 | * | 6/2006 | Verduci et al. ......... 296/100.06 |
| 2006/0038411 | A1 | * | 2/2006 | Plesternings et al. ........ 292/144 |

FOREIGN PATENT DOCUMENTS

WO    2007065418 A1    6/2007

* cited by examiner

*Primary Examiner*—H Gutman
*Assistant Examiner*—Melissa A Black
(74) *Attorney, Agent, or Firm*—Quinn Law Group, PLLC; Christopher W. Quinn

(57) ABSTRACT

A latch actuator assembly for a convertible top assembly is provided having a bell crank pivotable between a first position and a second position and a lever selectively engageable with the bell crank. The lever includes a first arm portion in selective engagement with a switch. Additionally, a second and third arm portion of the lever is in selective engagement with the bell crank. The bell crank is operable to engage the second and third arm portions of the lever when the bell crank is in the first and second positions, respectively, to bias the first arm portion of the lever out of engagement with the switch. Alternately, the first arm portion of the lever is operable to engage the switch when the bell crank pivots between the first position and the second position. A convertible top assembly and vehicle incorporating the latch actuator assembly of the present invention is also disclosed.

18 Claims, 2 Drawing Sheets

LATCH ASSEMBLY FOR A CONVERTIBLE TOP

TECHNICAL FIELD

The present invention relates to latch assemblies for use with a convertible top assembly of a vehicle.

BACKGROUND OF THE INVENTION

Most modern vehicles have rigid roof structures that permanently extend over and cover a passenger compartment. Manufacturers also provide a variety of designs that offer the vehicle operator the opportunity to partially or completely uncover the passenger compartment. Sunroofs and moonroofs are a few of the simplest designs to implement and offer the opportunity to open a portion of the vehicle roof for increased airflow. Designs of greater complexity allow the entire roof structure to be retracted and stored behind the passenger compartment.

Retractable roof, or convertible top, designs generally fall into two categories. The most common type of retractable roof design is a convertible soft-top. The convertible soft-top design includes an articulating structural framework with a flexible cloth or plastic outer skin. In an extended position, the front end of the articulating framework connects to a header above the vehicle windshield and the outer skin extends over the passenger compartment. When retracted, the articulating framework, along with the outer skin, folds into a compact shape for storage behind the passenger compartment of the vehicle.

Another retractable roof design is a retractable hardtop roof system. Retractable hardtops consist of one or more rigid roof elements or panels that are mechanically articulated such that they can be repositioned into a storage volume behind the passenger compartment. Because the retractable hardtop consists of rigid panels, the system can provide a much closer approximation of a traditional rigid roof structure. In the extended position, a retractable hardtop securely covers and seals the passenger compartment, giving the appearance of a permanent roof. A retractable hardtop is effective in sealing, securing, and reducing noise within the passenger compartment of the vehicle.

Most modern retractable hardtop designs consist of two or more articulatable panels that are automatically folded or stacked in the storage volume. In one design, referred to as a "clamshell" design, the roof structure is divided into a front panel and a rear panel. The front and rear panels are pivotably interconnected and the rear panel is pivotably connected to a support structure behind the passenger compartment. Examples of clamshell type retractable hardtop designs are shown in U.S. Pat. No. 6,217,104 to Neubrand, and U.S. Pat. No. 5,785,375 to Alexander et al.

In a clamshell design, the front and rear panels have both an inner and an outer surface, with the outer surfaces cooperating to form the outer surface of the roof structure when in the extended position. When retracted, the front panel folds to bring the inner surface of the front panel towards the inner surface of the rear panel, and both panels are together positioned within the storage volume. Often, a deck lid of the vehicle articulates into an out-of-the-way position to allow the front and rear panels to move into a position in the trunk. The deck lid is then repositioned to cover the front and rear panels.

An alternative design, which provides improved storage efficiency, may be referred to as a "stacking" design. Again, the roof is divided into two or more panels. However, when the hardtop is retracted, the roof panels are stacked such that the inner surface of one panel is adjacent to the outer surface of another panel. Because each panel typically has a concave inner surface and a convex outer surface, placing the inner surface of one panel next to the outer surface of another often results in efficient space utilization. Examples of stacking retractable hardtop designs are shown in U.S. Pat. No. 6,336,673 to Rothe et al., U.S. Pat. No. 6,318,793 to Rapin et al., U.S. Pat. No. 6,053,560 to Rothe, and U.S. Pat. No. 5,979,970 to Rothe et al.

In both the stacking and clamshell designs, at least one latch assembly is typically provided to secure or latch the panels with respect to each other to provide an airtight and watertight seal and to increase the structural rigidity of the roof structure. Typical latch assemblies include a plurality of switches operable to indicate the state of engagement of the latch mechanism.

SUMMARY OF THE INVENTION

A latch actuator assembly for a convertible top assembly is provided having a bell crank pivotable between a first position and a second position and a lever selectively engageable with the bell crank. The latch actuator assembly further includes a single switch, such as a micro switch. The lever is operable to selectively engage the switch to signal the position of the bell crank.

The latch actuator assembly may also include a spring mounted with respect to a first arm portion of the lever and operable to bias the first arm portion of the lever toward the switch. An actuator, such as a hydraulically activated actuator, may be provided to bias the bell crank between the first position and the second position.

The latch actuator assembly may further include first and second latch engagement linkages, while the bell crank may include a first arm portion and a second arm portion. The first latch engagement linkage is mounted with respect to the first arm portion of the bell crank and the second latch engagement linkage is mounted with respect to the second arm portion of the bell crank.

In a preferred embodiment, the lever includes a first arm portion in selective engagement with the switch. Additionally, second and third arm portions are provided in selective engagement with the bell crank. The bell crank is operable to engage the second and third arm portions of the lever when the bell crank is in the first and second positions, respectively, to bias the first arm portion of the lever out of engagement with the switch.

A convertible top assembly and a convertible vehicle incorporating the disclosed latch actuator assembly for a convertible top of the present invention is also described.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
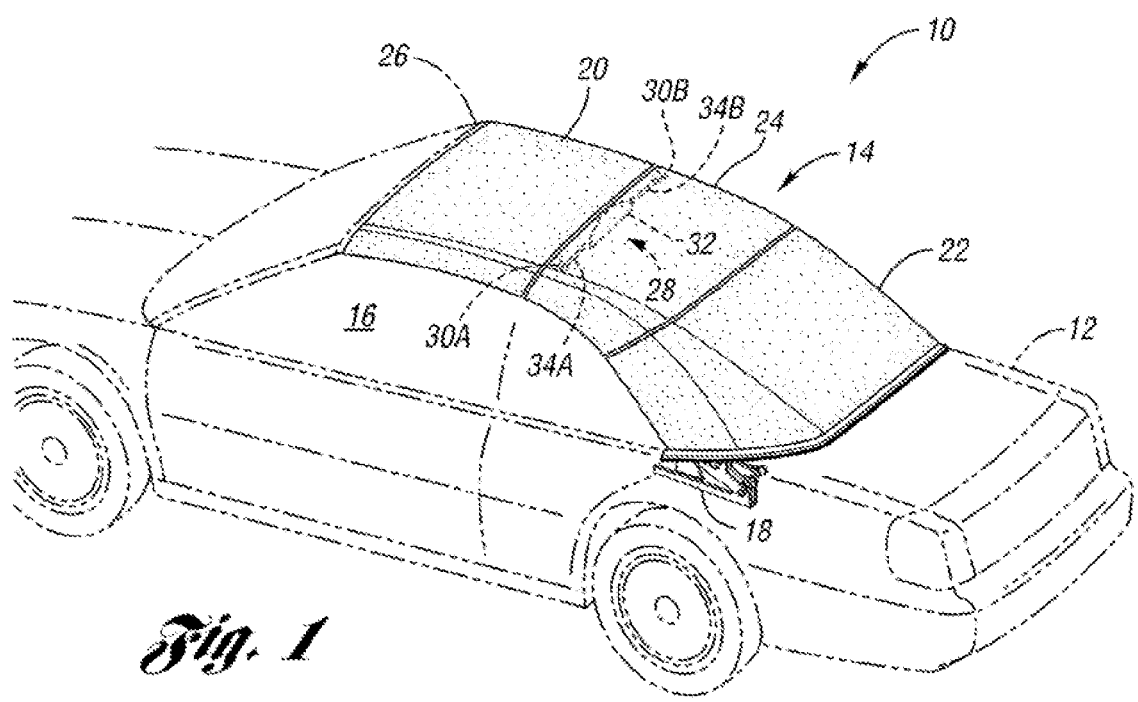
FIG. 1 is a schematic perspective view of a portion of a vehicle having a convertible top assembly incorporating a latch assembly consistent with the present invention.

Referring to the drawings wherein like reference numbers correspond to like or similar components throughout the several views, a vehicle is shown in FIG. 1 and is generally indicated at 10. The vehicle 10 includes a body structure 12, shown in phantom. A selectively retractable convertible top assembly 14 is pivotably mounted to the body structure 12, such that vehicle 10 may be characterized as a convertible vehicle. The convertible top assembly 14 is shown in FIG. 1 in the extended position. The body structure 12 and convertible top assembly 14, when in the extended position, cooperate to at least partially define a passenger compartment 16.

The convertible top assembly 14 is a retractable hardtop and is mounted to the body structure 12 by hinge mechanisms 18, one of which is shown in FIG. 1. The convertible top assembly 14 includes a front panel 20, rear panel 22, and intermediate panel 24, each of which articulate during retraction and extension of the convertible top assembly 14. To produce an airtight and watertight seal and to increase the structural rigidity of the convertible top assembly 14 when in the extended position, the rear panel 22 is preferably selectively securable or latchable with respect to the intermediate panel 24, while the intermediate panel 24 is preferably selectively latchable with respect to the front panel 20. Additionally, the front panel 20 is preferably selectively latchable with respect to a header 26, shown in phantom. A latch assembly 28 is schematically depicted in FIG. 1 and will be described in greater detail with reference to FIGS. 2 through 4. The latch assembly 28 is mounted with respect to the intermediate panel 24 and operates to selectively latch the intermediate panel 24 with respect to the front panel 20. The latch assembly 28 includes first and second selectively engageable latches 30A and 30B of types generally known to those skilled in the art. A latch actuator assembly 32, shown schematically in FIG. 1, selectively engages the first and second selectively engageable latches 30A and 30B through respective first and second latch engagement linkages 34A and 34B.

Although FIG. 1 illustrates the latch assembly 28 mounted with respect to the intermediate panel 24 to selectively latch the intermediate panel 24 to the front panel 20, those skilled in the art will recognize that the latch assembly 28 may be mounted to the front panel 20 to selectively latch the front panel 20 with respect to the intermediate panel 24 or the header 26. Additionally, the latch assembly 28 may be mounted to the header 26 to selectively latch the front panel 20 with respect to the header 26. Further, the latch assembly 28 may be mounted to either the intermediate panel 24 or the rear panel 22 to selectively latch the intermediate panel 24 with respect to the rear panel 22.

Figure 2:
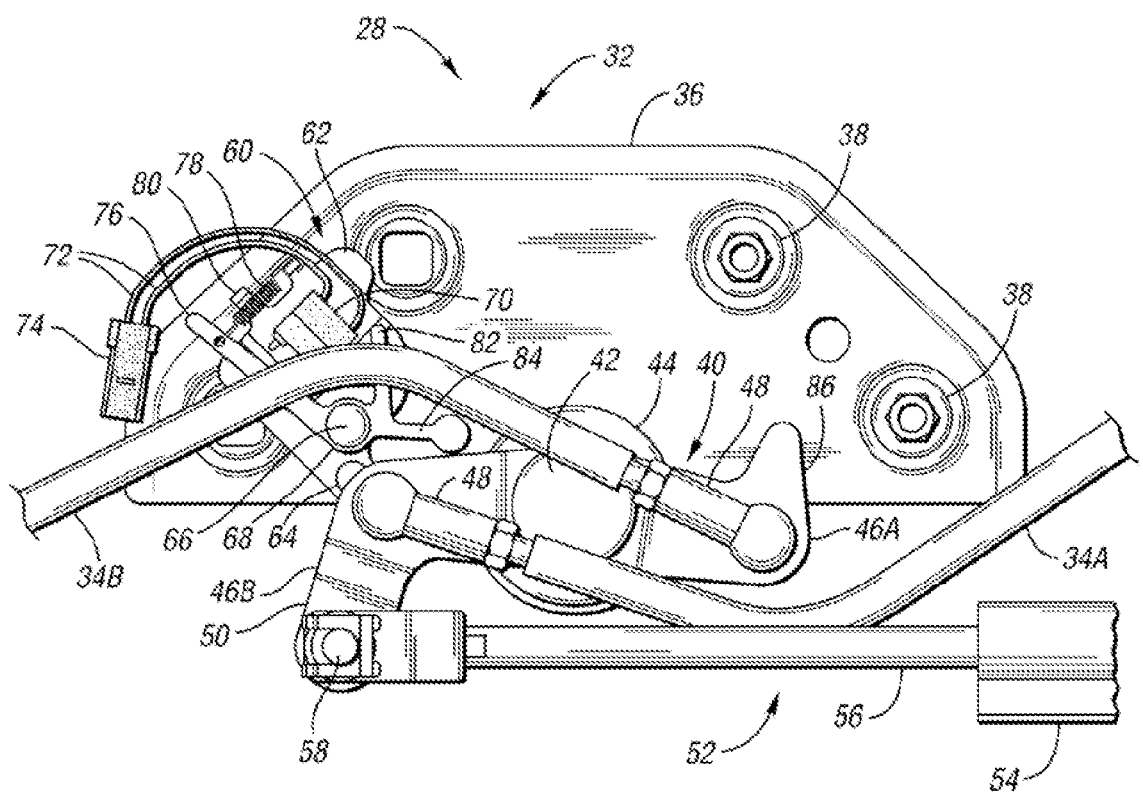
FIG. 2 is a bottom view illustrating a portion of the latch assembly of FIG. 1 in a first position.

Referring now to FIG. 2, and with continued reference to FIG. 1, there is shown a portion of the latch assembly 28 illustrating in detail the latch actuator assembly 32 and a portion of the first and second latch engagement linkages 34A and 34B. The latch actuator assembly 32 includes a base plate 36 sufficiently configured to mount the latch actuator assembly 32 with respect to one of the intermediate panel 24 (as shown in FIG. 1), the front panel 20, the rear panel 22, and the header 26 via fasteners 38 or other methods known to those skilled in the art. The base plate 36 is preferably stamped from sheet metal stock, such as steel or aluminum, of sufficient stiffness to resist deflection during operation of the latch actuator assembly 32.

A bell crank 40 is pivotably mounted with respect to the base plate 36 by a shaft 42. A bushing 44 is disposed between the base plate 36 and bell crank 40 providing a bearing surface to reduce sliding friction during movement of the bell crank 40. The bell crank 40 includes a first arm portion 46A and a second arm portion 46B having respective first and second latch engagement linkages 34A and 34B mounted thereto through ball end fittings 48. The ball end fittings 48 allow relative rotational movement between the first and second latch engagement linkages 34A and 34B and the bell crank 40.

Figure 3:
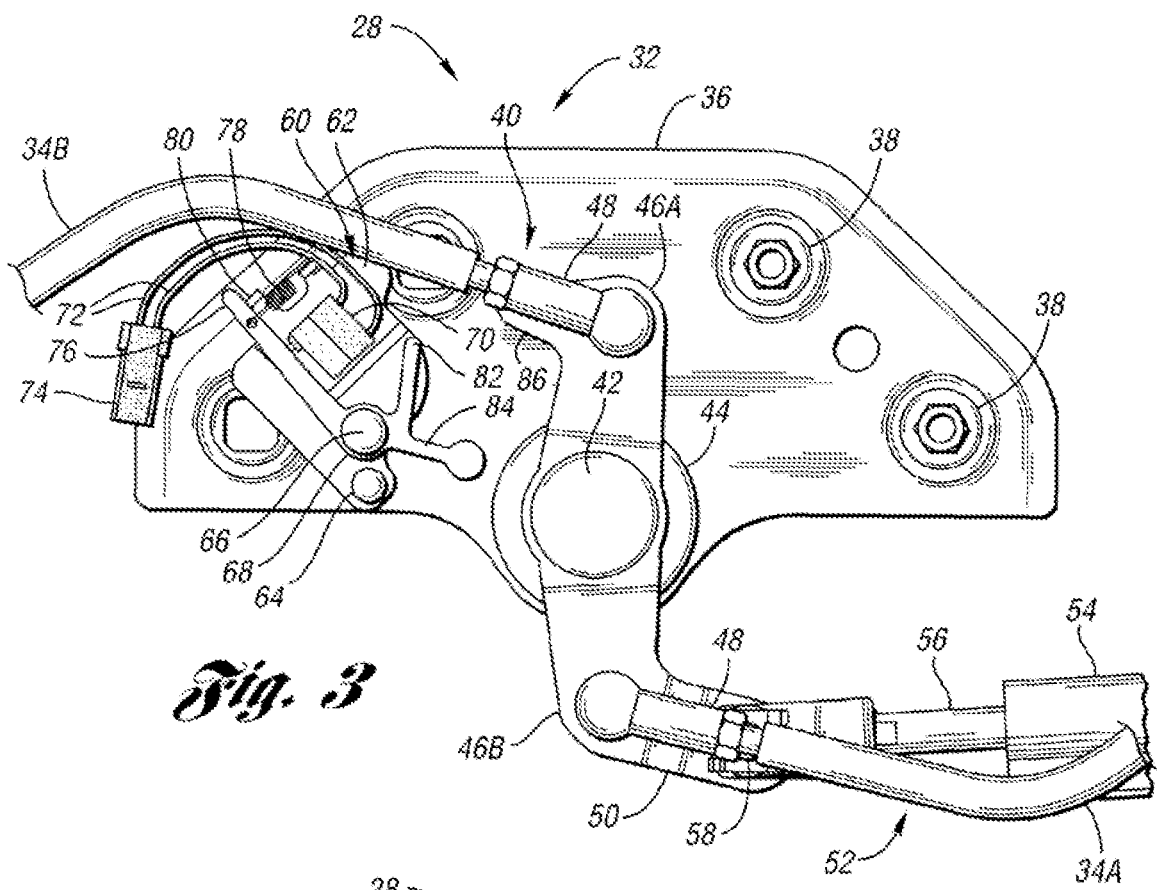
FIG. 3 is a bottom view illustrating a portion of the latch assembly of FIG. 1 in an intermediate position.
Figure 4:
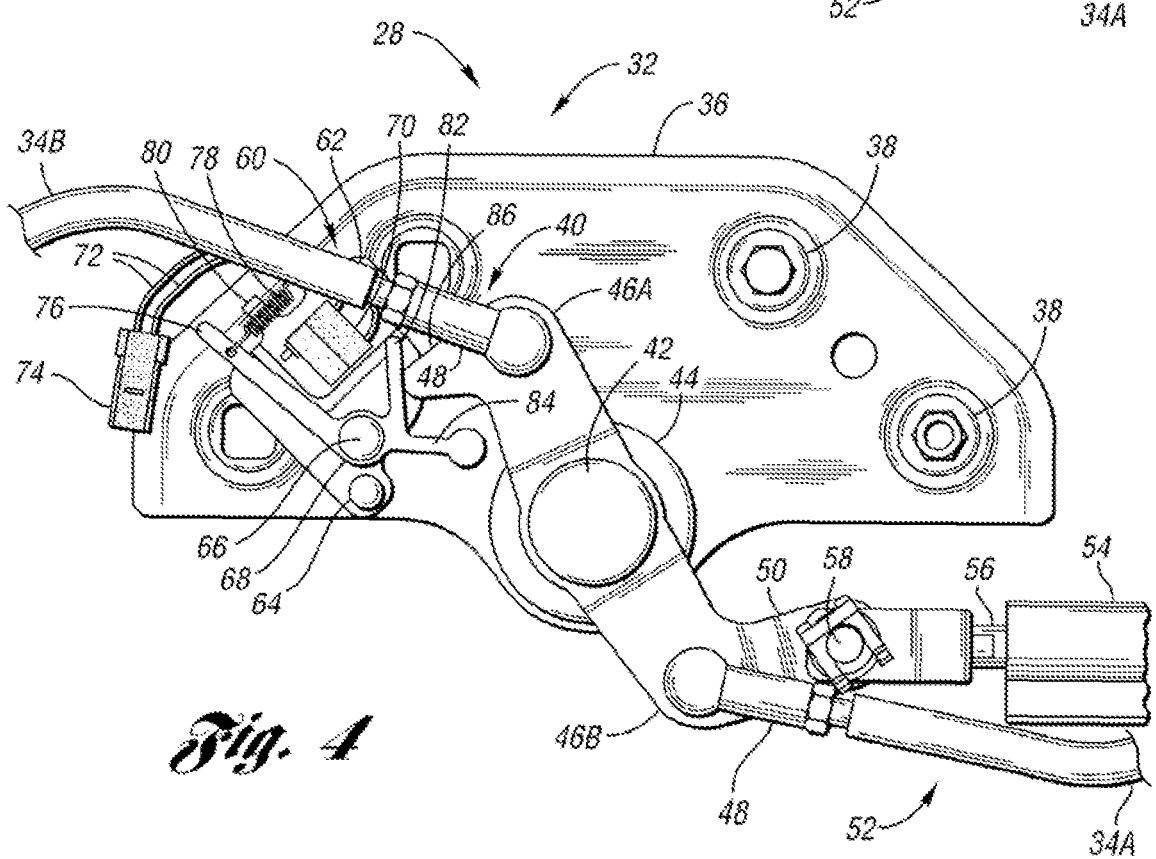
FIG. 4 is a bottom view illustrating a portion of the latch assembly of FIG. 1 in a second position.

Referring to FIGS. 2-4, the second arm portion 46B of the bell crank 40 includes a flange 50, which provides an attachment point for an actuator assembly 52, a portion of which is shown in FIG. 2. The actuator assembly 52 is preferably hydraulically actuated and includes a cylinder 54 having a ram 56 translatably disposed therein. The ram 56 is movable between an extended position, shown in FIG. 2, and a retracted position, shown in FIG. 4. The ram 56 is mounted to the flange 50 via a pin 58 to enable the actuator assembly 52 to urge the bell crank 40 to rotate between a first position, shown in FIG. 2, and a second position, shown in FIG. 4. With the bell crank 40 in the first position, the first and second selectively engageable latches 30A and 30B of FIG. 1 are engaged thereby securing or latching the intermediate panel 24 with respect to the front panel 20 when the convertible top assembly 14 is in the extended position. Although the actuator assembly 52 has been described herein as hydraulically actuated, those skilled in the art will recognize that other forms of actuation, such as pneumatics or motors, may be employed while falling within the scope of that which is claimed.

The latch actuator assembly 32 further includes a switch assembly 60 operable to signal the position of the bell crank 40 and hence the state of engagement of the first and second selectively engageable latches 30A and 30B. The switch assembly 60 includes a base plate 62 sufficiently configured for attachment to the base plate 36 with a fastener 64. A pin 66 pivotably mounts a lever 68 with respect to the base plate 62. A switch 70, such as a micro-switch, is mounted with respect to the base plate 62 and includes a plurality of leads 72 that terminate at a connector 74. The connector 74 is configured for electrical connection with a wiring harness, not shown, of the vehicle 10.

The lever 68 includes a first arm portion 76 that is selectively engageable with the switch 70. A spring member 78 is disposed between the first arm portion 76 and the base plate 62 and operates to bias the first arm portion 76 of the lever 68 toward the switch 70. A tab 80 is formed from the base plate 62 and operates to limit the travel of the first arm portion 76 of the lever 68 to reduce the likelihood of damaging the switch 70. The lever 68 further includes a second arm portion 82 and a third arm portion 84. The third arm portion 84 of the lever 68 is selectively engageable with the second arm portion 46B of the bell crank 40, while the second arm portion 82 of the lever 68 is selectively engageable with the first arm portion 46A of the bell crank 40. The second and third arm portions 82 and 84 of the lever 68 cooperate with the respective first and second arm portions 46A and 46B of the bell crank 40 to bias the first arm portion 76 of the lever 68 away from the switch 70.

In operation, as the convertible top assembly 14 is commanded to retract from the extended position as a result of operator input, the actuator assembly 52 will bias the flange 50 in the rightward direction as viewed in FIG. 2. The bell crank 40 will rotate in the counter-clockwise direction about shaft 42 thereby urging first and second latch engagement linkages 34A and 34B outward to disengage a respective one of the first and second selectively engageable latches 30A and 30B. As the bell crank 40 moves counter-clockwise it moves out of engagement with the third arm portion 84 of the lever 68, thereby allowing the spring member 78 to bias or urge the first arm portion 76 of the lever 68 into engagement with, and thereby close, the switch 70, as shown in FIG. 3. The switch 70 will then signal that the bell crank 40 is in an intermediate position, i.e. between the fist position and the second position. When the bell crank 40 has fully rotated to the second position, as shown in FIG. 4, a projection 86 formed on the first arm portion 46A of the bell crank engages the second arm portion 82 of the lever 68 thereby biasing the first arm portion 76 of the lever 68 out of engagement with the switch 70. Thus, the switch 70 opens, thereby indicating that the bell crank 40 has fully rotated into the second position.

By providing the lever 68 in selective engagement with the bell crank 40 and the switch 70, the latch actuator assembly 32 of the present invention provides a method of sensing the position of the bell crank 40 using only one switch 70, thereby reducing cost associated with the additional switches required in prior art latch actuator assemblies.

While the best modes for carrying out the invention have been described in detail, those familiar with the art to which this invention relates will recognize various alternative designs and embodiments for practicing the invention within the scope of the appended claims.

The invention claimed is:

1. A latch actuator assembly for a convertible top assembly comprising:
   a bell crank including:
      a first arm portion extending outward from the bell crank in a first direction; and
      a second arm portion extending outward from the bell crank in a second direction, substantially opposite the first direction, wherein said bell crank is pivotable between a first position and a second position;
   a lever selectively engageable with said first arm portion when said bell crank is in said first position and said lever is selectively engageable with said second arm portion when said bell crank is in said second position;
   a switch; and
   wherein said lever is operable to selectively engage said switch to signal the position of said bell crank.

2. The latch actuator assembly of claim 1, further comprising:
   a spring mounted with respect to a first arm portion of said lever; and
   wherein said spring is operable to bias said first arm portion of said lever toward said switch.

3. The latch actuator assembly of claim 1, further comprising an actuator operable to bias said bell crank between said first position and said second position.

4. The latch actuator assembly of claim 1, further comprising:
   first and second latch engagement linkages;
   wherein said first latch engagement linkage is mounted with respect to said first arm portion of said bell crank; and
   wherein said second latch engagement linkage is mounted with respect to said second arm portion of said bell crank.

5. The latch actuator assembly of claim 1, wherein said latch actuator assembly is hydraulically activated.

6. The latch actuator assembly of claim 1, wherein said switch is a micro-switch.

7. A latch actuator assembly for a convertible top assembly comprising:
   a bell crank pivotable between a first position and a second position;
   a lever selectively engageable with said bell crank;
   a switch, wherein said lever is operable to selectively engage said switch to signal the position of said bell crank;
   wherein said lever includes:
      a first arm portion in selective engagement with said switch;
      a second arm portion in selective engagement with said bell crank;
      a third arm portion in selective engagement with said bell crank, wherein said bell crank is operable to engage said second and third arm portions of said lever when said bell crank is in said first and second positions, respectively, to bias said first arm portion of said lever out of engagement with said switch.

8. The latch actuator assembly of claim 7, wherein said first arm portion of said lever is operable to engage said switch when said bell crank pivots between said first position and said second position.

9. A convertible top assembly comprising:
   a first panel;
   a second panel;
   wherein said first and second panel are selectively movable with respect to each other;
   a latch actuator assembly including:
      a bell crank including:
         a first arm portion extending outward from the bell crank in a first direction; and
         a second arm portion extending outward from the bell crank in a second direction, substantially opposite the first direction, wherein said bell crank is pivotable between a first position and a second position;
      a lever selectively engageable with said first arm portion when said bell crank is in said first position and said lever is selectively engageable with said second arm portion when said bell crank is in said second position;
      a switch;
      wherein said lever is operable to selectively engage said switch to signal the position of said bell crank; and
      wherein said latch actuator assembly is operable to selectively retain said first panel with respect to said second panel.

10. The convertible top assembly of claim 9, further comprising an actuator operable to bias said bell crank between said first position and said second position.

11. The convertible top assembly of claim 9, further comprising:
   first and second latch engagement linkages;
   wherein said first latch engagement linkage is mounted with respect to said first arm portion of said bell crank; and
   wherein said second latch engagement linkage is mounted with respect to said second arm portion of said bell crank.

12. A convertible top assembly comprising:
   a first panel;
   a second panel, wherein said first and second panel are selectively movable with respect to each other; and
   a latch actuator assembly including:
      a bell crank pivotable between a first position and a second position;
      a lever selectively engageable with said bell crank; and
      a switch, wherein said lever is operable to selectively engage said switch to signal the position of said bell crank, and wherein said latch actuator assembly is operable to selectively retain said first panel with respect to said second panel; and wherein said lever includes:
- a first arm portion in selective engagement with said switch;
- a second arm portion in selective engagement with said bell crank;
- a third arm portion in selective engagement with said bell crank, wherein said bell crank is operable to engage said second and third arm portions of said lever when said bell crank is in said first and second positions, respectively, to bias said first arm portion of said lever out of engagement with said switch.

13. The convertible top assembly of claim 12, wherein said first arm portion of said lever is operable to engage said switch when said bell crank pivots between said first position and said second position.

14. A convertible vehicle comprising:
a body structure;
a convertible top assembly mounted with respect to said body structure, wherein said convertible top assembly includes:
- a first panel;
- a second panel;
- wherein said first and second panel are selectively movable with respect to each other;
- a latch actuator assembly including:
    - a bell crank including: a first arm portion extending outward from the bell crank in a first direction; and a second arm portion extending outward from the bell crank in a second direction, substantially opposite the first direction, wherein said bell crank is pivotable between a first position and a second position;
    - a lever selectively engageable with said first arm portion when said bell crank is in said first position and said lever is selectively engageable with said second arm portion when said bell crank is in said second position;
    - a switch;
    - wherein said lever is operable to selectively engage said switch to signal the position of said bell crank; and
    - wherein said latch actuator assembly is operable to selectively retain said first panel with respect to said second panel.

15. The convertible vehicle of claim 14, wherein said latch actuator assembly further includes an actuator operable to bias said bell crank between said first position and said second position.

16. The convertible vehicle of claim 14, wherein the latch actuator assembly further includes:
- first and second latch engagement linkages;
- wherein said bell crank includes a first arm portion and a second arm portion;
- wherein said first latch engagement linkage is mounted with respect to said first arm portion of said bell crank; and
- wherein said second latch engagement linkage is mounted with respect to said second arm portion of said bell crank.

17. A convertible vehicle comprising:
a body structure;
a convertible top assembly mounted with respect to said body structure, wherein said convertible top assembly includes:
- a first panel;
- a second panel, wherein said first and second panel are selectively movable with respect to each other; and
- a latch actuator assembly including: a bell crank pivotable between a first position and a second position; a lever selectively engageable with said bell crank; and a switch, wherein said lever is operable to selectively engage said switch to signal the position of said bell crank; and wherein said latch actuator assembly is operable to selectively retain said first panel with respect to said second panel; and wherein said lever includes:
- a first arm portion in selective engagement with said switch;
- a second arm portion in selective engagement with said bell crank;
- a third arm portion in selective engagement with said bell crank; and
- wherein said bell crank is operable to engage said second and third arm portions of said lever when said bell crank is in said first and second positions, respectively, to bias said first arm portion of said lever out of engagement with said switch.

18. The convertible vehicle of claim 17, wherein said first arm portion of said lever is operable to engage said switch when said bell crank pivots between said first position and said second position.

* * * * *